Oct. 17, 1961  H. W. MOSER  3,004,456
MACHINES FOR PERFORMING OPERATIONS ON SHEET MATERIALS
Filed March 8, 1955  9 Sheets-Sheet 7
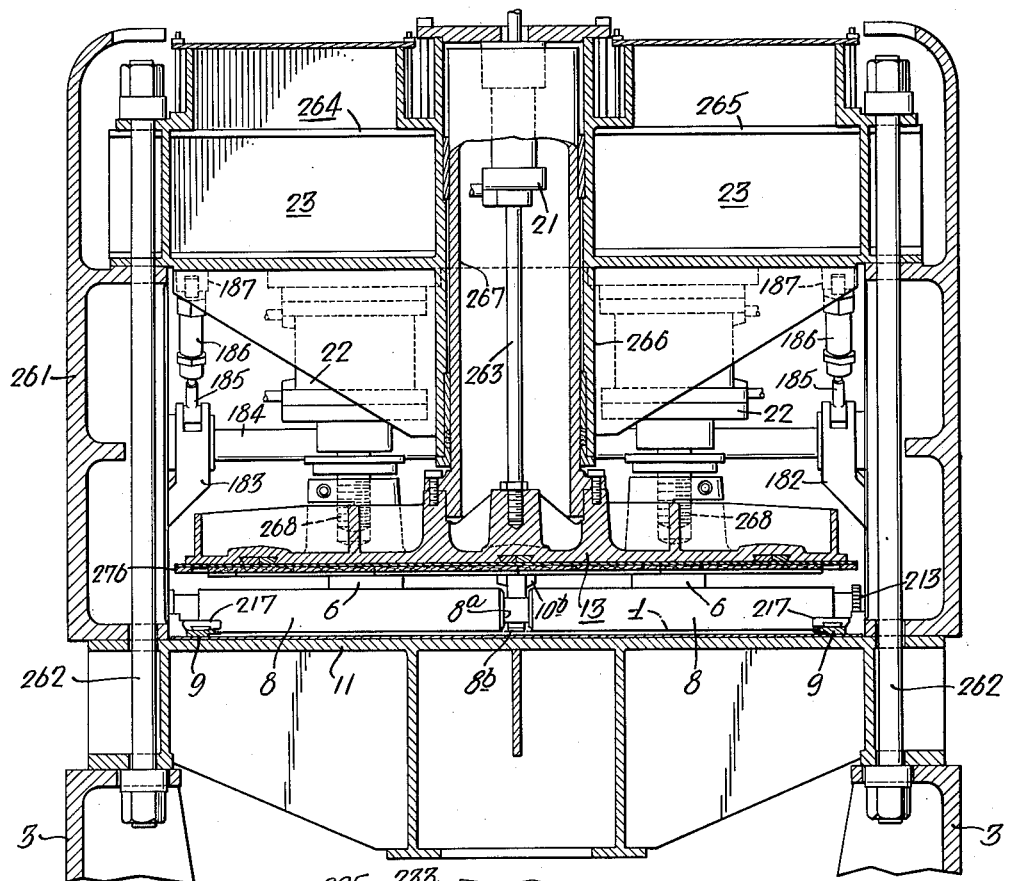
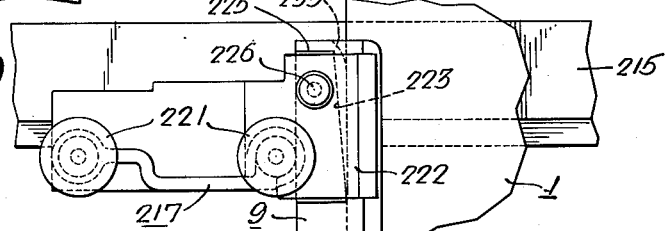
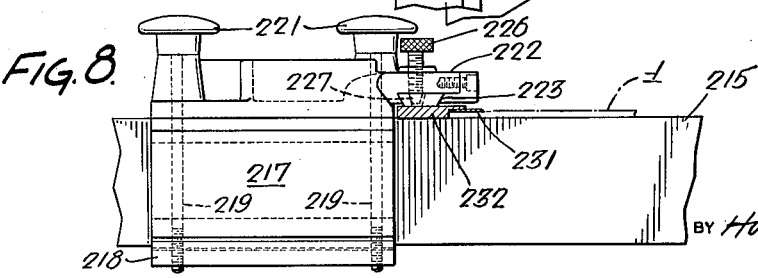
INVENTOR:
HENRY W. MOSER
BY Howson & Howson
ATTYS.

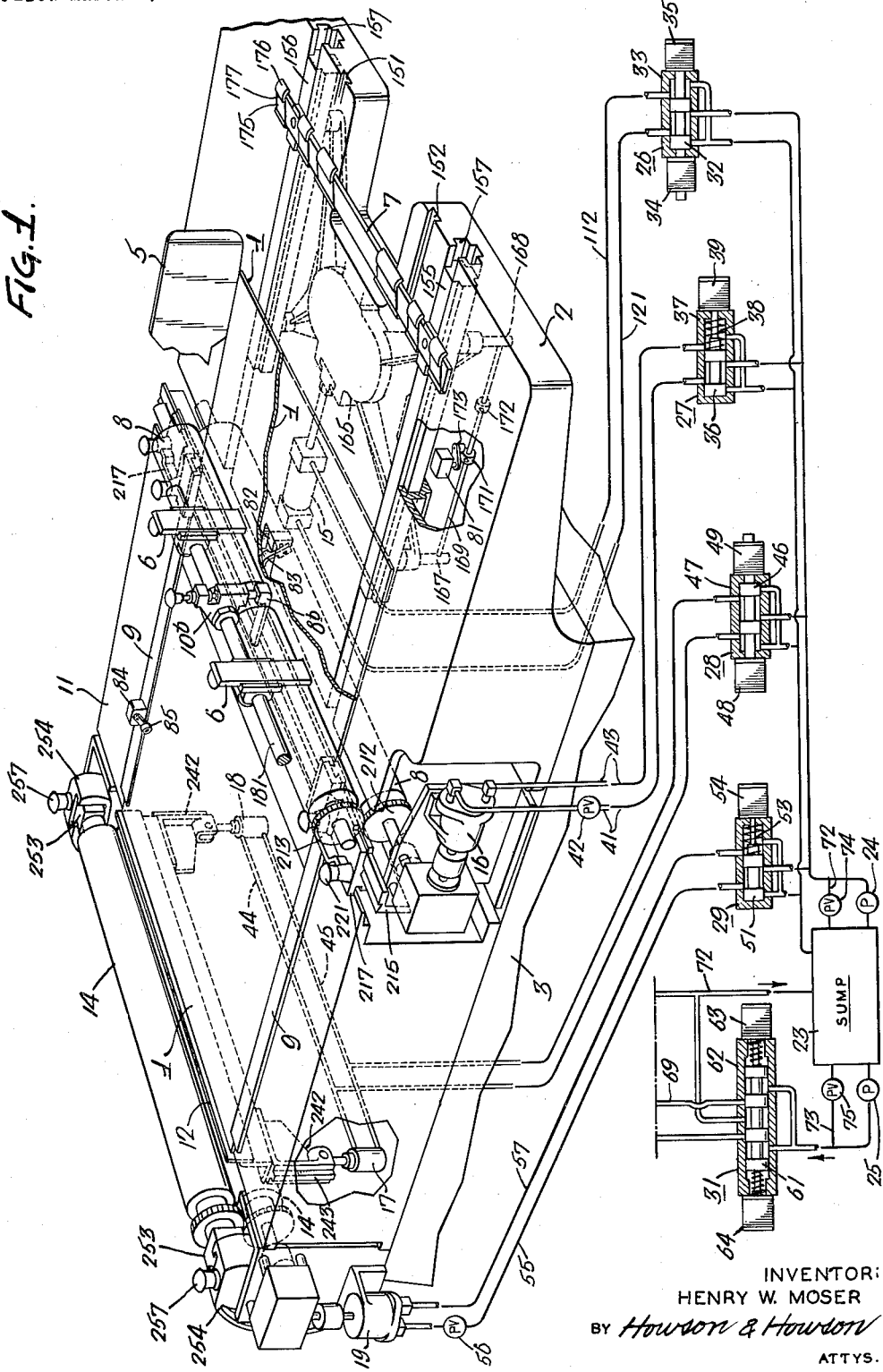

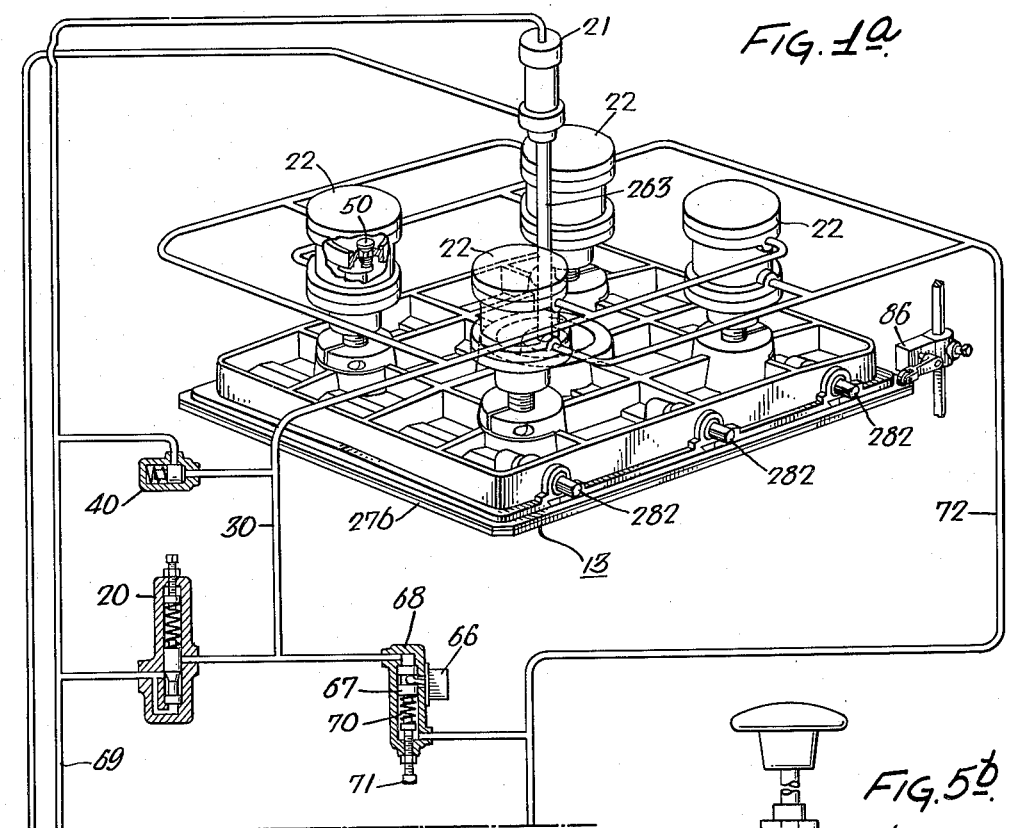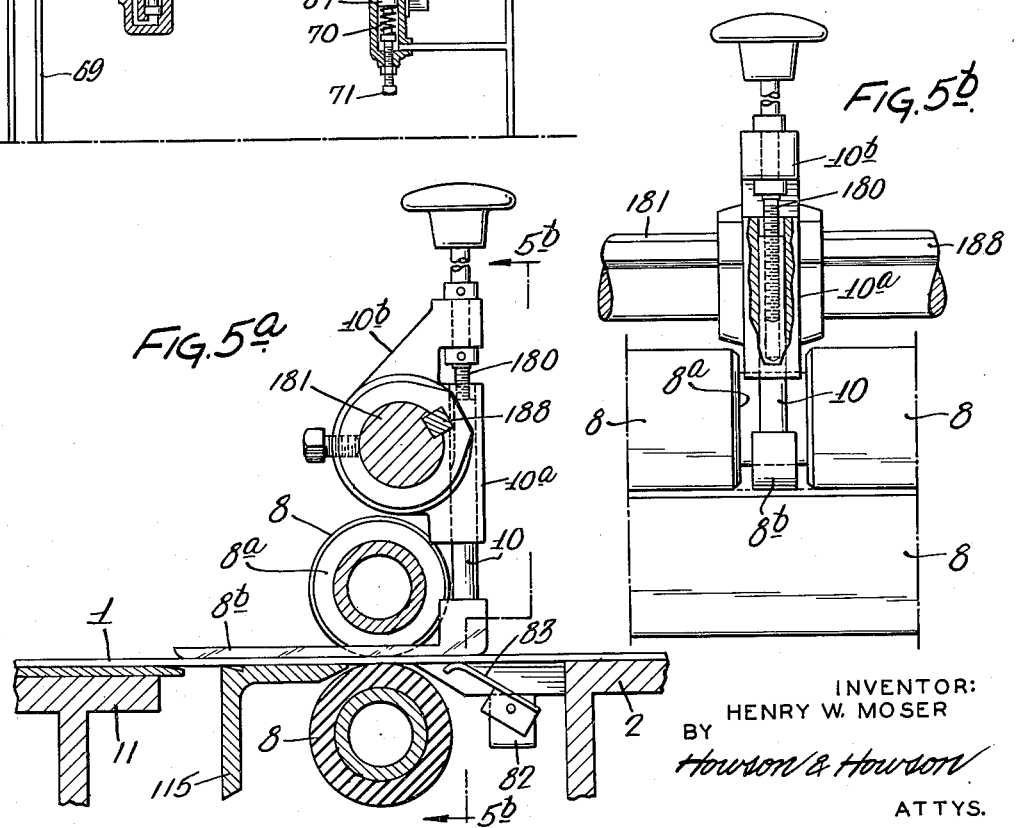

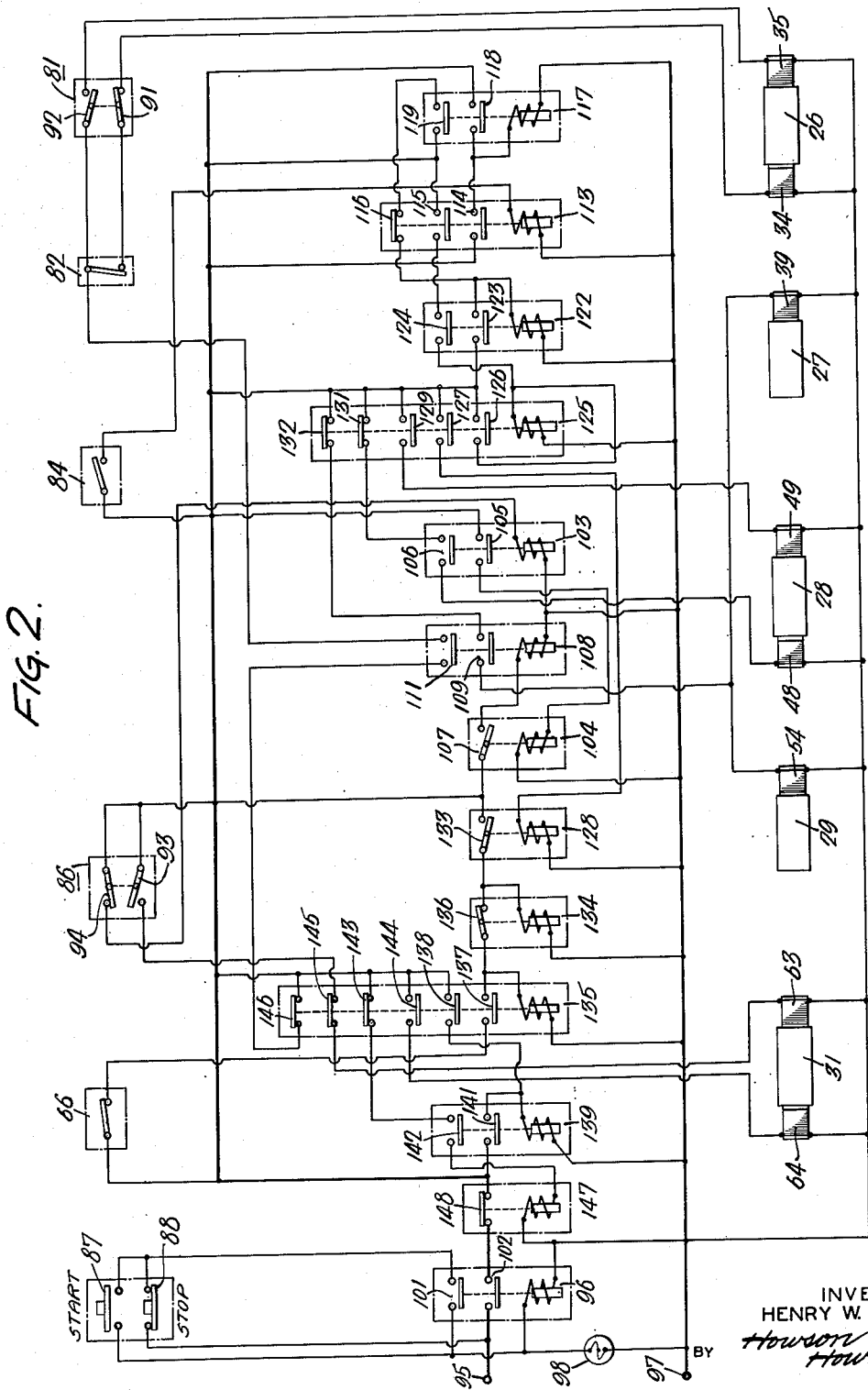

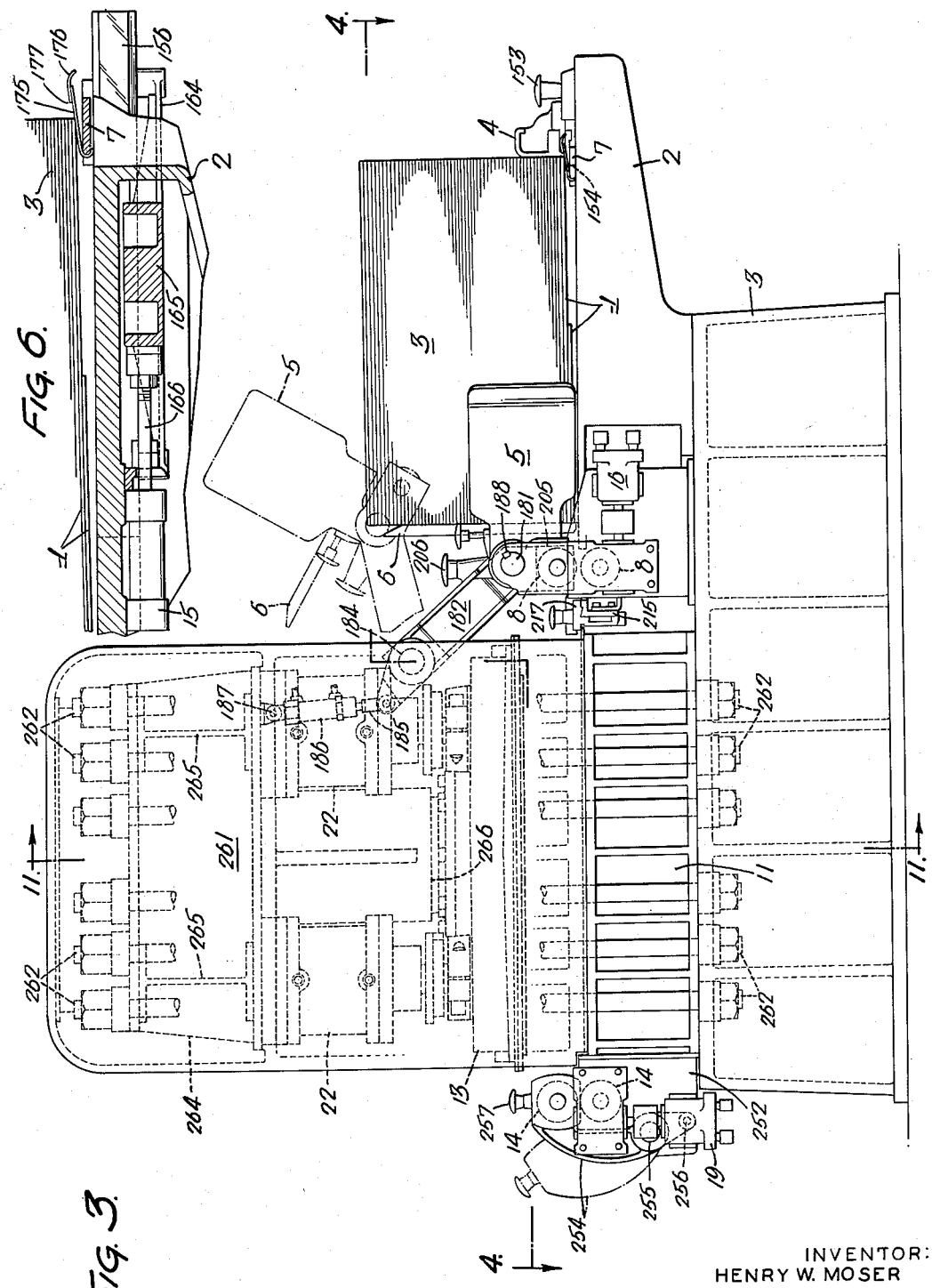

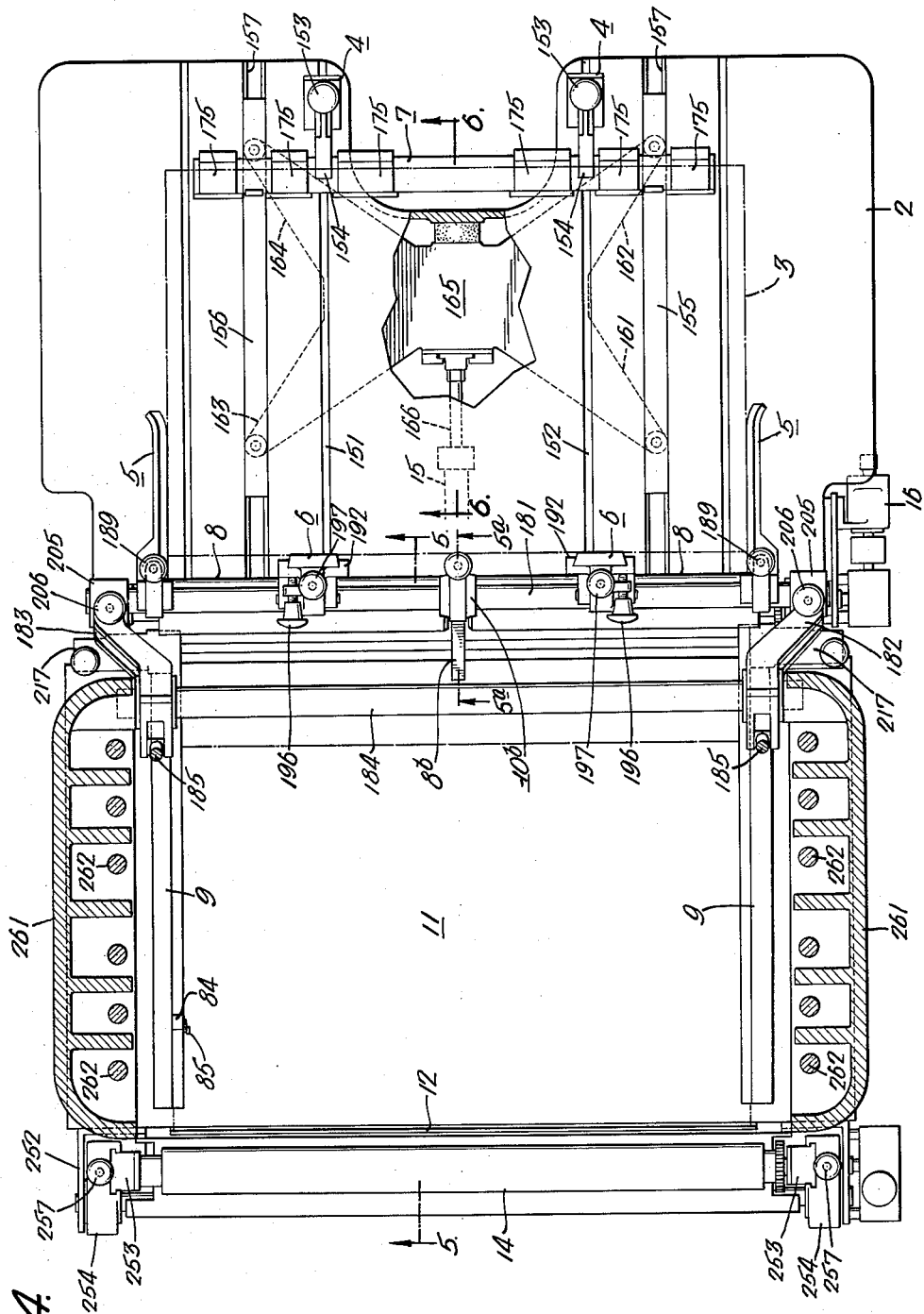

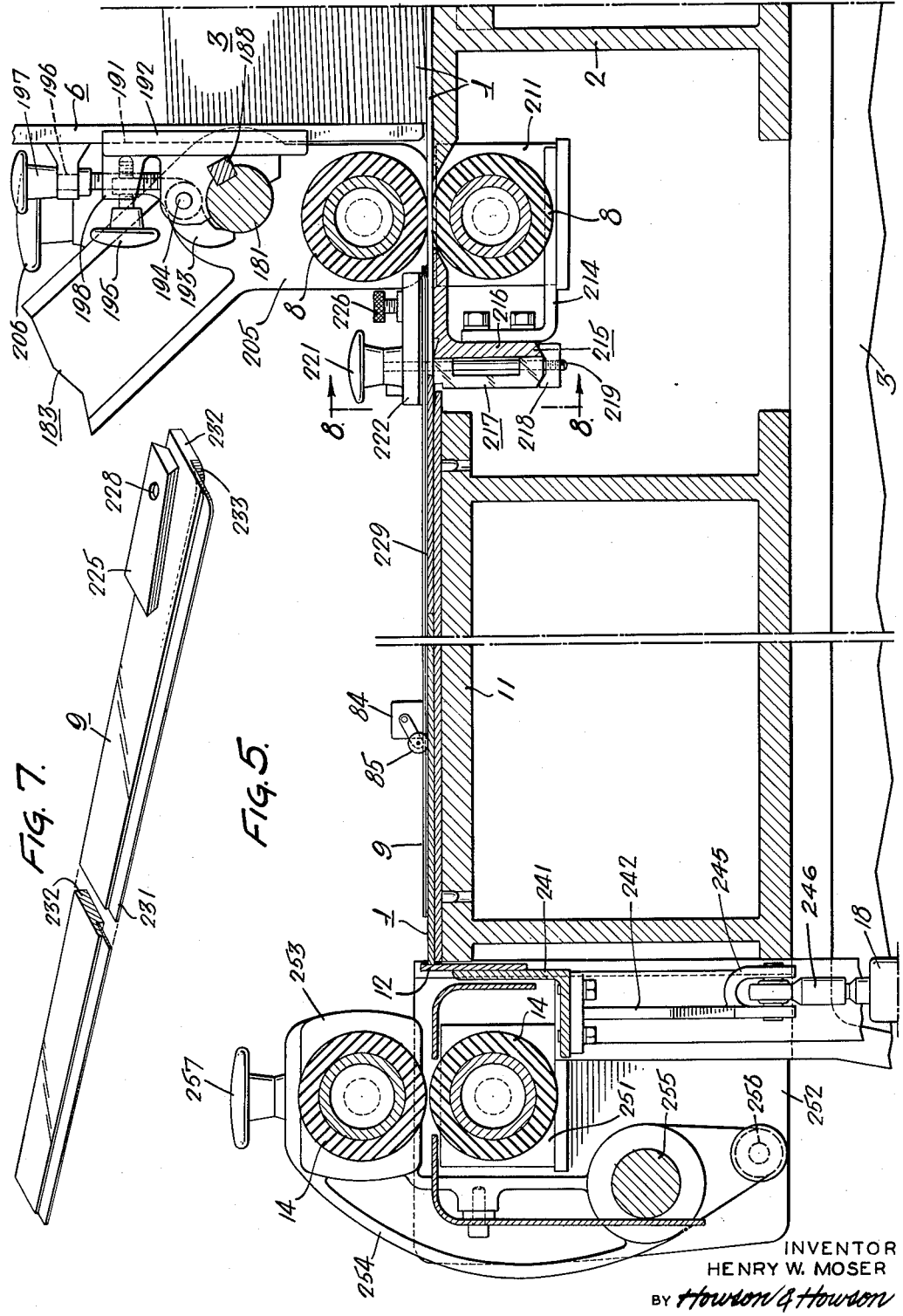

Oct. 17, 1961 H. W. MOSER 3,004,456
MACHINES FOR PERFORMING OPERATIONS ON SHEET MATERIALS
Filed March 8, 1955 9 Sheets-Sheet 8
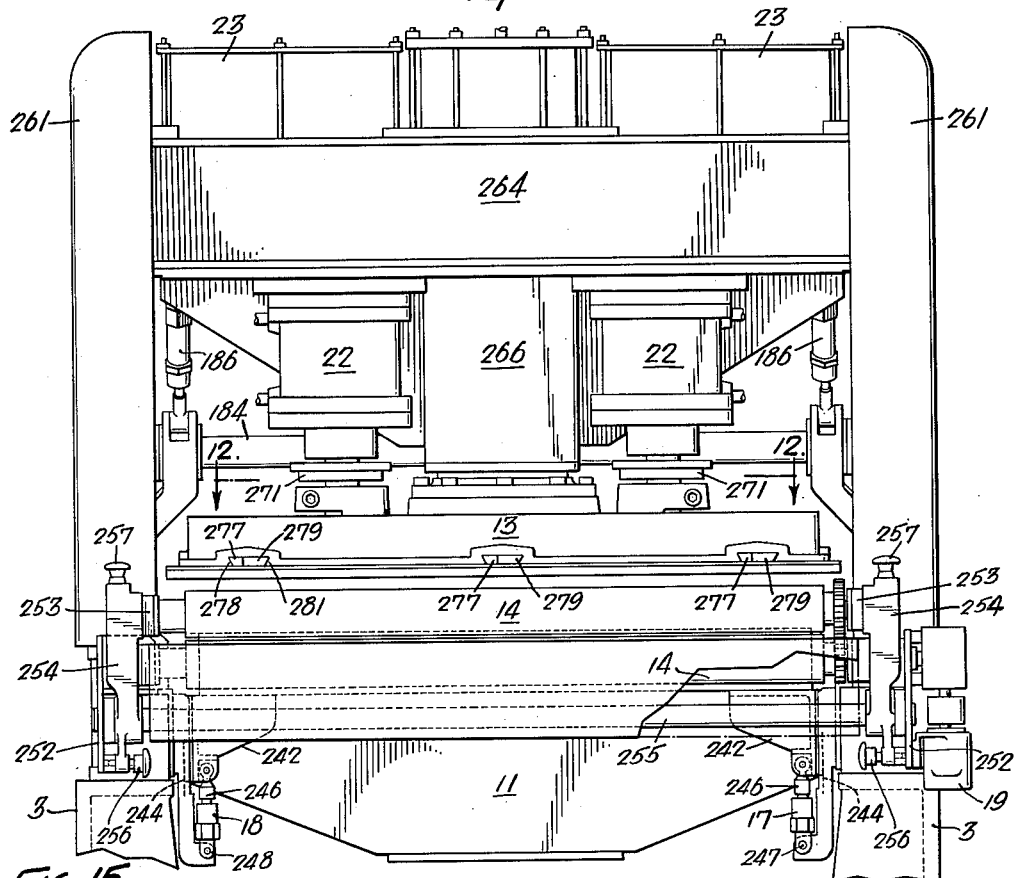
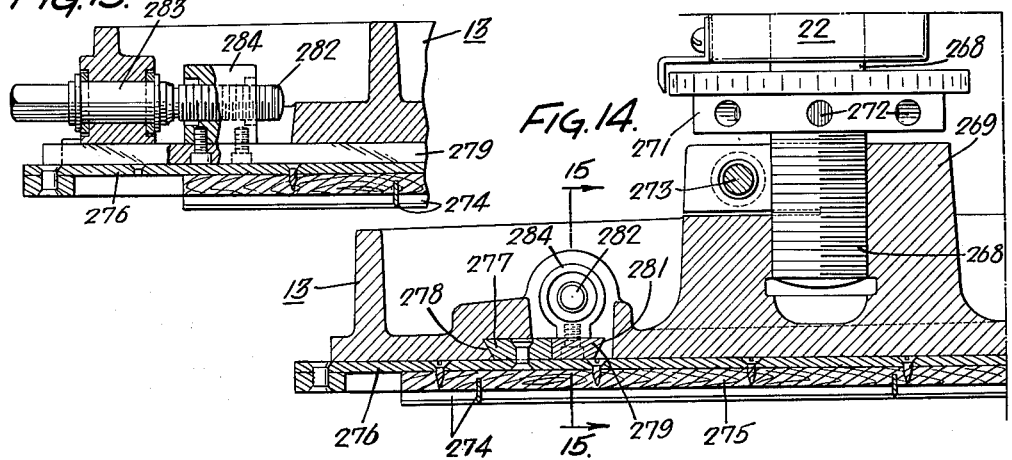
INVENTOR:
HENRY W. MOSER
BY Howson & Howson
ATTYS.

INVENTOR:
HENRY W. MOSER
BY Howson & Howson
ATTYS

United States Patent Office 3,004,456
Patented Oct. 17, 1961

3,004,456
MACHINES FOR PERFORMING OPERATIONS ON SHEET MATERIALS
Henry W. Moser, Haddonfield, N.J., assignor to Samuel M. Langston Co., Camden, N.J., a corporation of New Jersey
Filed Mar. 8, 1955, Ser. No. 492,897
2 Claims. (Cl. 83—80)

This invention relates to improvements in machines for performing cutting, creasing, printing, embossing or like operations on sheet materials such, for example, as corrugated board or the like, for forming therefrom finished articles or blanks from which the finished article is formed, and a principal object of the invention is to provide a machine of this class having improved structural and functional characteristics as hereinafter described.

The invention relates more particularly to that class of machine wherein the actual forming operation is performed by means of a platen press, and a specific object of the invention is to provide a machine of this character wherein the said press is hydraulically operated with resultant advantages hereinafter described.

Another object of the invention is to provide a machine of the stated class employing a hydraulically actuated press for the forming operation, wherein the structure of the press itself provides the means for compensating automatically for unbalanced pressures on the faces of the platens during the said operation which if not so compensated would tend to faulty formation, as also hereinafter more specifically set forth.

Still another object of the invention is to provide a machine of the stated class wherein all of the operations, including those of feeding the sheets of work material to the press and of withdrawing them from the press after the forming operations, are conducted by hydraulic means having individually adjustable force characteristics, and wherein the machine comprises a control system operative to actuate the hydraulic devices in predetermined repetitive sequence affording automatic cyclic operation of the machine.

Another object is to provide hydraulically actuated press means for the stated purpose, including devices affording an adjustable top limit to the total pressure applied to the work sheet regardless of the thickness of the latter.

As a result of the aforesaid hydraulic operation, the invention contemplates a machine capable of operating at relatively high rates of speed and substantially free from certain malfunctions and maladjustments inherent in mechanically operated machines of the same class.

A further object of the invention is to provide a novel and generally improved method of feeding successive sheets of the work material to the press, and for registering said sheets with precision on the press platen with respect to the forming tools in preparation for the forming operation.

The invention resides further in the novel hydraulic and electrical control systems and the associated control elements and also in certain mechanical and structural details hereinafter specifically described and illustrated in the attached drawings, wherein:

FIG. 1 is a diagrammatic view in perspective showing the essential elements of the machine and of the hydraulic system with exception of the movable press platen;

FIG. 1a is a diagrammatic view in perspective showing the movable press platen and the immediately associated parts of the hydraulic system;

FIG. 2 is a diagrammatic view showing the electrical control system and the manner in which it is associated with the hydraulic system;

FIG. 3 is a side elevational view of the machine;

FIG. 4 is a sectional plan view on the line 4—4, FIG. 3;

FIG. 5 is a fragmentary enlarged sectional view on the line 5—5, FIG. 4;

FIG. 5a is an enlarged sectional view on the line 5a—5a, FIG. 4;

FIG. 5b is a sectional view on the line 5b—5b, FIG. 5a;

FIG. 6 is a fragmentary enlarged sectional view on the line 6—6, FIG. 4;

FIG. 7 is an enlarged view in perspective of one of the important elements of the machine;

FIG. 8 is a fragmentary enlarged sectional view on the line 8—8, FIG. 5;

FIG. 9 is a plan view of the portion of the machine illustrated in FIG. 8;

FIG. 10 is a fragmentary end elevational view of the machine;

FIG. 11 is a sectional view on the line 11—11, FIG. 3;

FIG. 14 is a fragmentary sectional view on the line 14—14, FIG. 12, and

FIG. 15 is a fragmentary sectional view on the line 15—15, FIG. 14.

Figure 12:
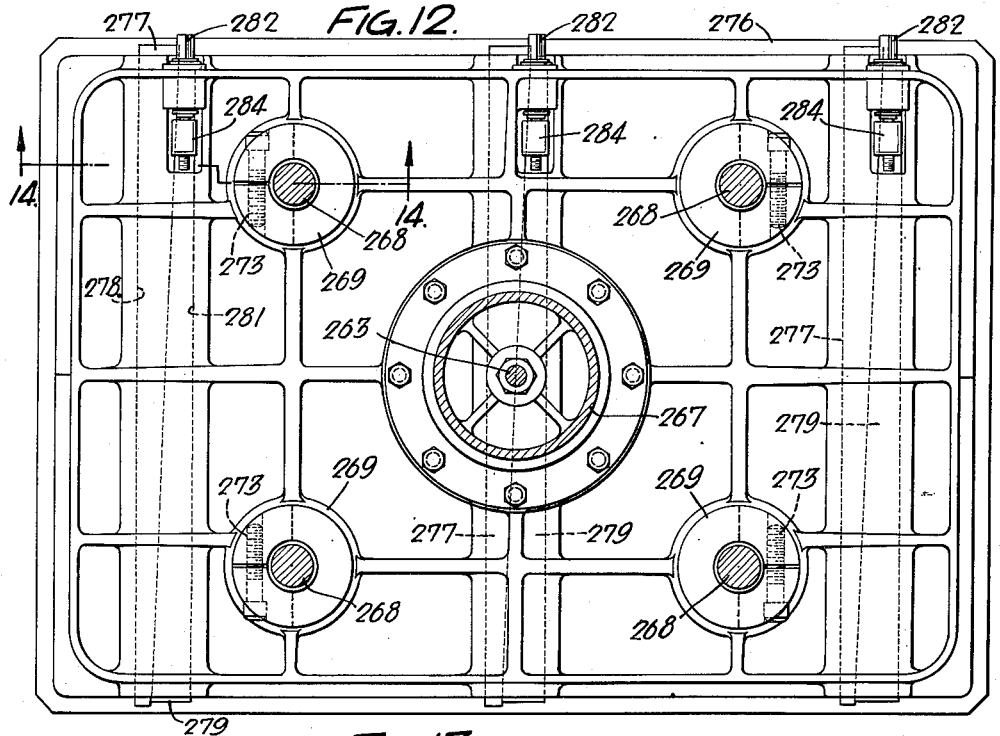
FIG. 12 is a sectional view on the line 12—12, FIG. 10.

Considering the machine in terms of broad function and with reference to the primary component elements and their respective functions, work sheets 1 from which in the present instance box blanks are to be formed are stacked upon a feed table 2. Associated with the table and functioning to maintain the stack 3 accurately in predetermined position on the table is a back-stop 4, which engages the rear of the stack, side guides 5, which confine the opposite sides of the stack, and front stops 6, 6 which are adjusted so that the gap between the lower edges thereof and the confronting surface of the feed table is just sufficient for passage of one only of the sheets 1 at a time.

The sheets 1 are fed from the bottom of the stack by means of a feed bar 7 which has a limited reciprocation between the rear edge of the stack and a point short of the front stops 6. The sheets 1 are fed by the bar 7 into the nip of a pair of feed rolls 8, 8 which are mounted immediately behind of the front stops 6, and by means of these rolls the sheets are advanced into a pair of side guides 9, 9 which contain the sheet both vertically and horizontally on the fixed platen 11 of a hydraulically actuated platen press. Under action of the rolls 8 the sheet 1 is fed to a point on the platen 11 short of a vertically movable register gate 12, and the feeding actions of the rolls 8 and of the bar 7 are relatively timed so that as the trailing edge of each sheet leaves the stack, permitting the adjoining sheet to move downwardly onto the table 2 and into position to pass under the front stop 6, the feed bar 7, under control of sheet actuated switch means hereinafter described, will operate to advance that sheet into the nip of the rolls 8, 8. The leading edge of the second sheet is thereby brought into abutment with the trailing edge of the first sheet now occupying the guides 9, and the latter sheet is then pushed by the second sheet propelled by the rolls 8 into engagement with the gate 12. At this point rotation of the rolls 8 is interrupted. The gate 12, in conjunction with the guides 9, accurately register the sheet with the blanking tools on the movable platen 13 of the press, and when the sheet when so registered are anchored on the plate 11 by the rollers 8, acting through the said second sheet, the guides 9 and gate 12 are thereby maintained in the registered position during the working stroke of the movable platen 13. When the blanking operation has been completed, the platen 13 moves upwardly, the gate 12 descends to free the forward edge of the blanked sheet, the rolls 8 again assume their feeding function, and the sheet is advanced into the nip of a pair of takeaway rolls 14, 14 which discharge the blank and the trim, if any, from the machine.

In accordance with the invention the entire machine is hydraulically actuated. The reciprocatory movement of the feed bar 7 is effected by means of a double acting hydraulic cylinder 15. The feed rolls 8 are operated through the medium of a hydraulic rotary motor 16. Double acting hydraulic cylinders 17 and 18 elevate and depress the gate 12; and the takeaway rolls 14 are operated by a hydraulic rotary motor 19. The upper or movable platen 13 of the press is raised and lowered by means of a hydraulic cylinder 21; and power for the working stroke is applied to the platen in the present instance through four hydraulic pressure cylinders 22 located respectively at the four corners of the platen.

All of these hydraulic motor means are connected in a common system which comprises a sump 23 for the hydraulic medium, pumps 24 and 25 which are connected to the sump and to the said motors through a series of valves 26, 27, 28, 29 and 31, the valves 26, 27, 28 and 29 controlling the connections between the pump 24 and the cylinder 15, the motor 16, the cylinders 17 and 18, and the motor 19 respectively. A valve 31 controls the connection of the pump 25 with the cylinders 21 and 22 of the platen 13.

The valve 26 is a double solenoid operated 4-way hydraulic valve, the valve element 32 of which is shifted to alternative positions at opposite ends of the valve casing 33 by means respectively of solenoids 34 and 35. When the element 32 is in the position shown in FIG. 1 of the drawings, the pressure side of the pump 24 is connected to the left end of the cylinder 15 as viewed in the said figure, while the opposite end of the cylinder is connected to the sump. When the element 32 is at the opposite end of the casing the connections are reversed so that the hydraulic pressure is applied to the right hand end of the cylinder 15, while the left hand end of the cylinder is exhausted to the sump.

The valve 27 is a solenoid operated spring offset 4-way hydraulic valve. When in the position shown in FIG. 1 of the drawings, the valve element 36 of this valve admits hydraulic pressure to a pipe 41 extending to the motor 16, and since this pipe 41 contains a spring-loaded check valve 42 the pressure is not permitted to reach the motor. The opposite side of the motor is connected under these circumstances with the sump 23 so that the motor 16 is not operating. When the valve element 36 is moved by the solenoid 39 to the opposite end of the cylinder 37 against pressure of spring 38 the connections are reversed, the pressure side of the pump being connected to the motor 16 through the unobstructed pipe 43 and the pipe 41 being connected to the sump. Under these circumstances the motor 16 will be in operation.

The corresponding ends of the cylinders 17 and 18, both of which are connected to the underside of the gate 12, are connected to the double solenoid operated 4-way hydraulic valve 28, by pipes 44 and 45 respectively. The position of the valve element 46 of the valve 28 in one or other of the alternative positions at opposite ends respectively of the casing 47, is controlled by solenoids 48 and 49 which are operatively connected to the opposite ends of the element. When the element 46 is in the position shown in the drawings, the pressure side of the pump 24 is connected to the duct 45 and to the lower ends of the cylinders 17 and 18. When the valve element 46 is at the opposite end of the casing the pressure side of the pump is connected to the pipe 44 and the pipe 45 is then connected to the sump. The cylinders 17 and 18 may thus be operated simultaneously to elevate or depress the gate 12 as required.

The valve 29 is a single solenoid operated spring offset 4-way hydraulic valve. When the valve element 51 of this valve is in the position shown, the pressure side of the pump is connected with a pipe 55 extending to the motor 19, said pipe containing a spring-loaded check valve 56 which prevents the flow of hydraulic pressure medium through the pipe to the motor. The opposite side of the motor is connected through a pipe 57 to the sump, and in this position of the valve therefore the motor 19 is inoperative. When the valve element is moved to the opposite end of the casing the pressure side of the pump is connected to the pipe 57 and the check valve 56 in the pipe 55 permits flow of the hydraulic medium from the discharge side of the motor to the sump. The motor is then in operation.

Valve 31 is a double solenoid spring centered 4-way hydraulic valve shown with valve element 61 in the center position. Valve element 61 in this position closes the supply and return lines above and below the piston in cylinder 21 and thereby supports and holds platen 13 stationary. Solenoid 63 when energized moves valve element 61 to the left in FIG. 1 and connects the pressure side of the pump 25 through pipe 69 to the upper end of cylinder 21, while the lower end of cylinder 21 is connected to the sump. The cylinder 21 therefore operates to lower the platen 13.

The downward movement of platen 13 is arrested by contacting the work load, thus permitting pump 25 to overcome the resistance of adjustable spring loaded sequence valve 20, thus diverting pump pressure to the upper ends of the four cylinders 22 through the pipe system 30, shown in FIG. 1a, which connects the said cylinders with the pipe 69. The pressure thus permitted to enter cylinders 22 is imposed also on the adjustable spring loaded hydraulic pressure switch 66. The setting of this switch limits the pressure applied to the work and signals the reversal of platen 13 as hereinafter described. Solenoid 64 when energized moves valve element 61 to the right so as to connect the pressure from pump 25 to the underside of piston in cylinder 21 and to connect the upper end of cylinder 21, and also the upper ends of cylinders 22 to the sump, the latter cylinders by way of return check valve 40, see FIG. 1a. Thus platen 13 moves upward to contact adjustable limit switch 86 hereinafter described.

In the above-described sequence of operations, it will be noted that during the initial and major part of the downward movement of the platen 13, the upper ends of the cylinders 22 are shut off from the hydraulic pressure in pipe 69 by valve 20. To permit free downward movement of the pistons in the cylinders 22 under these conditions, each piston is provided with a check valve 50 which permits by passing of the hydraulic medium directly from the lower ends to the upper ends of the cylinders, the lower ends of the cylinders being connected to the sump 23 by pipe system 72 shown in FIG. 1a.

Over-pressure relief for pumps 24 and 25 is afforded by adjustable spring loaded valves 74 and 75 which vent to the sump 23.

The operations of the solenoids which control the valves 26, 27, 28, 29 and 31 and the sequential operation of the various elements of the machine described above which afford continuous automatic operation of the machine, are a function of a comprehensive electrical control system. Aside from various solenoid actuated switches and relays hereinafter described, this system includes certain switch elements associated directly with the operating elements of the machine and the work sheets. Thus, the movements of the feed bar 7 both actuate and are in part controlled by a double throw switch 81. A second switch 82 comprises an actuator located in the path of the work sheets fed from the stack 3 at a point in advance of the feed rolls 8. As shown in FIG. 1, this switch is held in one position when the actuating finger 83 is contacted by an overlying sheet 1, and in another position when the finger is released as the trailing edge of the sheet clears the finger.

A third switch 84 is also operatively associated with the work sheets, this switch comprising a finger 85 which is adapted to engage the upper surfaces of the successive sheets as they move over the platen 11 toward the gate 12. The finger 85 is actuated by elevating engagement therewith of the forward edge of the advancing sheet, and the finger is again depressed when it leaves the trailing edge of the sheet after the press operating is completed. A fourth control switch 86 is operatively associated with the movable platen 13 of the press; this switch is positioned for engagement by the platen as the latter moves into the elevated position, and is released when the platen moves downwardly under actuation by the pressure cylinder 21 as previously described.

The electrical system, illustrated in FIG. 2 can best be described in terms of its functions. Let it be assumed that the several elements of the machine and the valves 26, 27, 28, 29 and 31 are in the positions shown in FIG. 1. The feed bar 7 is retracted and ready for a working stroke; the platen 13 is elevated, and the switch 66 is closed, the piston 67 which actuates this switch being in the elevated position, as also shown in FIG. 1a. The finger 83 of the switch 82 is elevated and the switch is closed; and the finger 85 of the switch 84 is depressed and the switch is closed. Since the platen 13 is in the elevated position, the switch 86 has been tripped, and the blades 93 and 94 of the switch are open and closed respectively. The gate 12 is in the elevated position as shown in FIG. 1. The feed rolls 8 and takeaway rolls 14 are inoperative. The switches 81, 82, 84, 86 and 66, and the starting and stopping switches 87 and 88 respectively are also in the position shown in FIG. 1. It will be noted that the switch blade 91 of the double pole switch 81 is closed, whereas the blade 92 of this switch is open. Also the blade 93 of the double pole switch 86 is open, while the other blade 94 of this switch is closed. The switch 82 is closed; and the switch 84 is open. The starting button 87 is open, the stop button 88 is closed, and the machine is stationary.

The cycle is started by depressing the starting button 87. Current then flows from one side of the line, represented by terminal 95, through the closed stop switch 88 and the now closed starting switch 87 and energizes contactor solenoid 96 which is connected to the other side of the line extending from terminal 97. Current also flows through the shunt circuit containing signal light 98 energization of which indicates that the system is alive.

Energization of the solenoid 96 closes normally open contacts 101 and 102. Closing of contact 101 interlocks the solenoid 96 and permits release of the button 87. Closing of contact 102 connects the line 95 to the balance of the circuit.

As previously set forth the press platen 13 is elevated which closes the normally open blade 94 of switch 86 and opens the blade 93. Closing of the contact 102 will have the effect of energizing solenoid 103 and time delay solenoid 104. Energization of solenoid 103 closes normally open contact 105 and interlocks solenoids 103 and 104. Energization of solenoid 103 also closes contact 106 thereby energizing solenoid 48 of gate control valve 28 which draws the valve element 46 of this valve to the left as viewed in FIG. 1 and lowers the gate 12.

Upon completion of adjustable time delay cycle of solenoid 104, contact 107 closes thereby energizing solenoid 108. This closes contact 109 and energizes solenoid 54 of takeaway roll control valve 29. Solenoid 54 draws valve element 51 to the right connecting the takeaway roll actuating motor 19 with the pressure side of the pump 24 and initiates operation of the rolls 14. The closing of contact 109 also energizes solenoid 39 of feed control valve 27, drawing the valve element 36 to the right as viewed in FIG. 1 and connecting the feed roll motor 16 to the pressure side of the pump 24, thereby initiating operation of the feed rolls 8.

Energization of solenoid 108 also closes contact 111 and thereby energizes the line containing switch 82 and switch 81. Switch 82 and blade 91 of switch 81 are closed so that closure of the contact 111 results in energization of solenoid 34 of feed table control valve 26 thereby shifting valve element 32 to the right as viewed in FIG. 1 and connecting the pipe 112 with the pressure side of pump 24. The cylinder 15 is thereby actuated to advance the feed bar 7 and to push the bottom sheet of the stack 3 on the work table into the nip of the feed rolls 8. The sheet advances over the platen 11 of the press until the rear edge leaves the nip of the rolls 8, at which point its forward motion ceases, and in this position also the leading edge of the sheet has not reached the finger 85 of the switch 84.

The advance or feeding movement of the feed bar 7 which initiated the feeding of the lowermost sheet of the stack as described resulted eventually in actuation of the double pole switch 81 to close the blade 92 and open the blade 91, the result being to de-energize solenoid 34 and to energize solenoid 35 thereby shifting the valve element 32 of the control valve 26 to the opposite end of the cylinder 33 as shown in FIG. 1 and admitting pressure fluid from the pump to the pipe 121. This actuates the cylinder 15 to return the feed bar 7 to the retracted position in which it is again in position to feed the next sheet from the bottom of the stack. Return of the feed bar to this retracted position again actuates the switch 81 returning the switch elements 91 and 92 to the position shown in FIG. 1 with consequent re-energization of solenoid 34 and de-energization of solenoid 35 and reversal of the valve 26 to initiate a second advance or feeding movement of the feed bar advancing a second sheet from the bottom of the stack to the nip of the feed rolls 8.

The normally closed switch 82 was opened by the initial sheet fed from the bottom of the stack 3 as described above, and this switch remained open until the actuating finger 83 was released by the trailing edge of the sheet, at which time the sheet was entirely clear of the stack. While the switch 82 remained open the solenoid 34 was necessarily de-energized. A second feeding movement of the feed bar 7 was thereby prevented until such time as the initial sheet had cleared the stack, as indicated by the freeing of the finger 83 by the initial sheet and consequent reclosing of the switch 82.

As previously described, the initial sheet has advanced to a position in the guides 9 wherein the trailing edge has just cleared the nip of the rolls 8, and the forward motion of the sheet has terminated. The forward edge of the second sheet after passing through the rolls 8 immediately contacts the rear edge of the first sheet and the second sheet then acts as to push the leading sheet forwardly and into the nip of the takeaway rolls 14, which as previously described are now in motion, whereby these rolls act to rapidly withdraw the sheet from the press. Since the takeaway rolls 14 operate at a higher rate of speed than the rolls 8, the initial or leading sheet is drawn by the takeaway rolls away from the second or pusher sheet leaving a gap between the two.

The sheet initially fed onto the platen 11 and subsequently advanced by the second sheet as described, contacts the finger 85 and closes the normally open switch 84 and thereby energizes the solenoid 113, closes the associated contacts 114 and 115 and opens the contact 116. The closing of contact 114 energizes solenoid 117 and thereby closes contacts 118 and 119. Contact 118, when so closed, acts to hold the solenoid 117. As the trailing edge of the leading sheet is withdrawn from the finger 85 of the switch 84 and the latter switch is again opened, which by reason of the rapid takeway of the sheet by the rolls 14 occurs before the leading edge of the second sheet reaches finger 85, solenoid 113 is de-energized, contacts 114 and 115 are opened, and contact 116 is closed. The closing of this latter contact energizes a solenoid 122, the current flowing through the now closed contact 119 associated with the solenoid 117. Energization of solenoid 122 closes contacts 123 and 124, and the closing of the former contact interlocks the solenoid 122.

The second sheet from the stack 3, advancing into the press under the pushing action of a third sheet fed from the stack 3 by the continuing action of the feed bar 7 to the feed rolls 8, now contacts and again closes the switch 84, re-energizing solenoid 113, re-opening contact 116 and closing contacts 114 and 115, the closing of the latter contact energizing solenoid 125 to which current flows through the now closed contact 124. Energization of solenoid 125 closes contact 126 and thereby interlocks solenoid 125. Energized solenoid 125 also closes contact 127 and thereby energizes time delay solenoid 128. Energization of solenoid 125 also closes contact 129 and thereby energizes solenoid 49 of gate valve 28, moving valve element 46 to the right to the position shown in FIG. 1 wherein the pressure side of pump 24 is connected to the pipe 45 extending to the bottoms of the gate-actuating cylinders 17 and 18. The gate 12 is thereby elevated. Solenoid 125 when energized also acts to open contact 131 which releases gate valve solenoid 48 to permit solenoid 49 to shift the valve element 46 as described.

Solenoid 125 also opens contact 132 thereby de-energizing feed valve solenoid 39 and permitting the spring 38 to shift valve element 36 in cylinder 37 to position wherein the feed roll pump 16 becomes inoperative. The opening of contact 132 also releases solenoid 54 of takeaway control valve 29 permitting the spring 53 to return the valve element 51 to the left hand end of the cylinder 52 and rendering the pump 19 which operates takeaway rolls 14 inoperative. At this point the second sheet has advanced into solid abutment at its leading edge with the now elevated gate 12 and is therefore in exact registry with the blanking tools on platen 13. It will be understood that the final movement of this sheet into abutment with the gate 12 has been effected by engagement of the forward edge of the succeeding or third sheet fed from the bottom of the stack by action of the pusher bar 7 and propelled into engagement with the rear edge of the leading sheet by the feed rolls 8. The interruption of the feed rolls 8 as described above releases the pressure of the trailing sheet upon the forward sheet and precludes buckling.

Upon energization of the time delay solenoid 128, that solenoid acts to close contact 133 which results in energization of adjustable time delay solenoid 134 and also energizes solenoid 135 by flow of current through the normally closed contact 136 operatively associated with the solenoid 134.

Energization of solenoid 135 closes contact 137 and interlocks and holds solenoid 135 through the normally closed pressure switch 66. Energization of solenoid 135 also closes contact 138 to thereby energize solenoid 139. The energization of this latter solenoid closes contact 141 to interlock the solenoid 139, and also closes the associated contact 142. Energization of solenoid 135 opens contact 143 and simultaneously closes contact 144. The closing of this latter contact energizing solenoid 64 of control valve 31 moving valve element 61 to the left as viewed in FIG. 1 and connecting the pressure side of the pump 25 with the upper end of platen cylinder 21. The platen 13 is thereby moved downwardly.

Energization of solenoid 135 also opens contacts 145 and 146, the opening of the latter contact de-energizing the feed table circuit containing the switches 81 and 82 to prevent the feed bar 7 from operating during the pressing cycle.

Upon completion of the time delay cycle of adjustable time delay solenoid 134, contact 136 opens. When the press platen 13 reaches the desired adjustable pressure, the normally closed pressure switch 66 will be opened by downward movement of the piston 67 to release the solenoid 135. De-energization of solenoid 135 opens contacts 137, 138 and 144, thereby de-energizing press valve solenoid 64. At the same time contact 145 is closed to energize solenoid 63 of control valve 31 this by way of the normally closed limit switch 93. The closing of contact 146 re-energizes the feed table circuit containing switches 81 and 82; and the closing of contact 143 associated with the solenoid 135 energizes solenoid 147 by way of the now closed contact 142.

Energization of the solenoid 147 opens normally closed contact 148 and de-energizes the complete circuit, resetting it for the next operation. The press continues its upward movement until limit switch 93 opens to de-energize press valve solenoid 63, and the switch element 94 of switch 86 simultaneously closes to re-start the cycle.

The circuit of the feed bar 7 is controlled by contacts 146 and 111. The direction and length of travel of the feed bar is determined by the physical placement of the switch 81 with relation to the stops, hereinafter described, on the feed bar carriage which actuate that double pole switch. The normally closed switch 82 prevents double feeding as described.

With reference more particularly to the structural and mechanical details of the machine, the feed table 2 is mounted on a sub-frame 3 which also provides a support for the platen press as herein after described. The back stop, comprises two identical stop elements 4, 4 in the present instance, which are adjustable in dovetail slots 151 and 152 in the table to and from the front stops 6 for accommodation of work sheets of differing sizes, and which may be secured in adjusted position by suitable clamping means actuated by handle elements 153. At its forward side each of the stop elements 4 is provided with a shallow projecting foot element 154 upon which the rear edge of the stack 3 is supported. This support of the rear edge of the stack 3 slightly above the surface of the work table relieves the feed bar 7 and its elements from the weight of the stack 3.

The bar 7 is attached to the upper surface of a pair of slides 155 and 156 which are closely and slidably confined in longitudinal guide slots 157 in the table. Secured to the undersides of the slides 155 and 156, which are exposed at the underside of the table, are the arms 161, 162, 163 and 164 of a rigid spider 165 which is attached at its forward side to the piston rod 166 of the piston (not shown) of the hydraulic working cylinder 15. Depending from the outer end of each of the arms 161 and 162 is a pin, 167 and 168 respectively, which support a rod 169, and this rod carries adjustable stop elements 171 and 172 which are positioned for engagement with the actuating finger 173 of the switch 81. As previously described, the switch 81 controls the reciprocatory movement of the feed bar 7, and the adjusted locations of the lugs 171 and 172 with respect to the switch-actuating finger 173 and to each other determine the length of the stroke of the feed bar and the points at which the reversals of the movement take place.

As best shown in FIGS. 1, 4 and 6 the feed bar 7 comprises a plurality of resilient fingers designated collectively by the reference numeral 175 and these fingers extend rearwardly and upwardly at an angle from the forward edge of the bar 7. Each of the fingers 175 has a concave tip 176 at its upper rear end which tip at its forward edge forms a shoulder 177 for engaging the rear edge of the lowermost sheet 1 of the stack 3 which, as previously described, is supported on the shoulders 154 of the back stops 4, 4. In the fully retracted position of the bar 7 the fingers 175 occupy the positions shown in FIG. 6 wherein the shoulders 177 lie rearwardly of the rear face of the stack. Forward movement of the bar from this position engages the shoulders 177 with the rear edge of the lowermost sheet and slides that sheet forwardly from under the stack and into the nip of the feed rolls 8 as previously described. In the retractive movement of the bar 7 the upper concave faces of the tip elements 176 ride freely on the underside of the overlying and now lowermost sheet of the stack. A sheet feeding device of similar construction is disclosed in U.S. Patent No. 1,797,692.

The side guides 5, which confine the sides of the stack take the form of substantially rectangular plates which are adjustably clamped on a cross rail 181. The ends of the rail are secured in the lower ends of arms 182 and 183 which are pivotally mounted on the ends of a transverse shaft 184 at opposite sides respectively of the machine. The upper end of each of the arms 182 and 183 is connected by a rod 185 to the piston of a hydraulic cylinder 186, the upper end of each of the cylinders being pivotally secured at 187 to the frame of the hydraulic press. When hydraulic pressure is applied to the upper ends of the cylinders 186 the piston rods 185 are forced downwardly to elevate the arms 182 and 183 and with them the rod 181, and the side guides 5, as indicated in broken lines in FIG. 3. The guides 5 are splined to the rail, as indicated at 188 in FIG. 3, and may be adjusted longitudinally on the rail by release of the clamping means through clamp handles 189.

The front stops 6, 6 are also adjustably mounted on the rail 181. As shown in FIG. 5 each of the stops 6 is mounted for vertical adjustment in a dovetail guideway 191 in a stop-supporting bracket 192. This bracket comprises a body portion secured by a key 188 to the rail, and a clamping finger 193 which is pivotally secured at 194 to the body of the bracket and is held in clamping engagement with the rail by means of a screw 195. Each of the back stops 6 has at its rear side a lug 196 which is engaged by an adjusting screw 197 threaded into a boss 198 at the back of the body portion of the bracket 192. By turning the screw 197 the stop may be adjusted vertically to bring the lower end thereof into the required position with respect to the surface of the work table. The front stops 6 are adjusted so that their lower edges afford just sufficient space between the upper surface of the table 2 to clear a single work sheet from the bottom of the stack, the plates precluding inadvertent double feeding of more than a single sheet from the stack. As illustrated in FIGS. 1 and 5a the table is recessed from the forward edge for accommodation of the actuating finger 83 of the switch 82. The releasable clamping means for the front stops 6 is similar to the means used for adjustable attachment to the rail 181 of the side guides 5 described above.

As shown in FIGS. 5a and 5b, the upper feed roll 8 is provided with a groove 8a at its longitudinal center for reception of a vertically adjustable guide shoe 8b. This shoe is carried at the lower end of a rod 10 which is mounted in a sleeve 10a on a bracket 10b secured to the cross rail 181, the rod being keyed or splined in the sleeve to preclude angular displacement. The rod may be adjusted longitudinally in the sleeve by a screw 180. The shoe 8b extends forwardly to the proximate edge of the platen 11 and serves the important purpose of confining the work sheets vertically immediately ahead of and behind the feed rolls, thus avoiding overlap of the sheets before they pass in to control of the sheet guides 9.

The upper of the feed rolls 8 is journalled in brackets 205 secured respectively to the lower ends of the arms 182 and 183. Each of the brackets carries a bearing for the roll journal, and these bearings are mounted in the bracket for adjustment vertically to regulate the relative positions of the rolls and the pressures which they exert upon the work sheets in the feeding operation. In the present instance, the bearings are adjustable in the brackets by manipulation of hand screws 206 secured in the respective brackets and having threaded engagement with the associated bearing structure. It will be apparent that when the arms 182 and 183 are elevated as described above, the upper feed roll 8 and its journal structures will be elevated with the rail 181, the side guides 5, and the front stops 6. This leaves the lower roll and the adjoining mechanisms accessible for insertion of die frame 276, observation and adjustment. The upper feed roll 8 is held down in the operative position by hydraulic pressure applied to the lower ends of the cylinders 186, and in this position the journal bracket 205 seats solidly on the journal structure of the lower feed roll.

The lower feed roll 8 is journalled in suitable journal structures 211, 211 at opposite sides respectively of the frame. The lower roll is driven, as indicated in FIGS. 1 and 3 by the motor 16, and the two rolls are interconnected by gears 212 and 213. As shown in FIG. 5, arms 214 extend forwardly from the journal structures 211 and upwardly to form a support for a transverse beam 215 which extends across the width of the machine. The vertical web 216 of this beam forms a dovetail guide for a pair of brackets 217, one at each side of the machine, each bracket being clamped to the guide by means of clamping bar 218 which engages the lower edge of the dovetail as illustrated in FIG. 5. This bar 218 is engaged by the threaded ends of a pair of clamping screws 219, see FIGS. 5, 8 and 9, which turn freely in the upper part of the bracket and which may be manipulated by knobs 221, 221 at their upper ends to draw the clamping bar 218 upwardly or to release the bar for adjustment of the bracket longitudinally of the beam 216.

Each of the brackets 217 has at its upper end a flange 222, see FIG. 8, which projects toward the center of the machine and which has at its underside a dovetail socket 223. The socket 223 is tapered longitudinally as indicated in FIG. 9 and is adapted to receive a dovetailed wedge 225 at the upper side and at one end of the proximate guide bar 9. One of these guides is shown in FIG. 7. When the dovetail wedge 225 is inserted in the correspondingly formed socket 223, the bar 9 is anchored securely in the bracket 217 and extends freely toward the gate 12 as well illustrated in FIGS. 4 and 5. The dovetail wedges 225 are positively anchored in the sockets 223 by means of lock screws 226 which are threaded downwardly through the flange 222 of the bracket and which have tapered lower extremities 227, see FIG. 8, which enter correspondingly tapered recesses 228 at the tops of the wedges 225.

When thus secured in position, the body portions 232 of the guide bars 9 lie flatly against the surface 229 of the lower platen 11. Each of the bars has at its inner edge a projecting lip 231 which seats in the top of a rabbitted recess at the underside of the guide as best shown in FIG. 7, and extends towards the longitudinal center line of the platen and in spaced relation to the upper surface of the latter, as shown in FIGS. 5 and 8. The space between this lip and upper surface of the platen is sufficient to accommodate the thickness of a single work sheet 1 of which one is shown in full lines in FIG. 5 and in broken lines in FIG. 8. The ends of the guides which are secured in the brackets 217 lie in close proximity to the nip of the rolls 8, 8 as shown in FIG. 5, and at this end the inner surface 233 of the body portion 232 of the bar flares outwardly, as indicated in FIG. 7 and by the broken line in FIG. 9. Also, the lip element 231 at this end of the guide turns upwardly, as indicated at 234 in FIG. 7, so that at this end which is the entering end for the sheets advanced by the feed rolls 8, 8, there is ample space for reception of the sheet and the leading edge of the sheet will pass freely into and between the two guide bars. Except for the rear terminal end formation described above, the guides 9, 9 will be relatively adjusted and are constructed so that a work sheet passing between the guides will be confined at the side edges both in the plane of the sheet and also in a direction normal to said plane, the latter confinement being between the lip 231 and the upper surface of the platen. By releasing the screws 219, the guides may be adjusted longitudinally on the beam 216 transversely of the machine to accommodate sheets of differing widths.

The gate structure is illustrated in FIGS. 1, 5 and 10. It comprises the gate proper, in the form of a rectangular plate designated by the reference numeral 12, which immediately adjoins the forward end of the platen 11 and which moves in a vertical plane between an elevated operative position, shown in FIG. 5, and a retracted or lowered position in which the upper edge of the gate is below the surface of the platen. The gate 12 is secured to a transverse angle beam 241 which has secured to the underside thereof and at each end a bracket 242, each bracket having a projecting rib 243 which is slidably fitted in a vertical guideway 244 in the confronting portion of the frame of the machine. Each of the brackets 242 has a clevice 245 at its lower end in which is pivotally attached the piston rod 246 of the proximate gate-actuating cylinder, 17 and 18, and each of these cylinders is pivotally secured at the underside thereof to the frame as indicated at 247 and 248 respectively.

The lower of the two takeaway rolls 14, 14 is journalled in a suitable journal structure 251 secured in the frame extension 252, see FIG. 5. The upper of the rolls 14 is journalled at its opposite ends in suitable journals 253 supported in the upper ends of arms 254 secured at opposite ends respectively of a transverse shaft 255 journalled in the frame. The arms 254 extend below the shaft 255 and each carries a pin 256 which may be interlocked with the frame to hold the arms in operative position as shown in FIG. 5. The pins 256 may be withdrawn to release the arms and to permit them to be moved about the axis of the shaft 255 to a position indicated in broken lines in FIG. 3 wherein the upper roll 14 is removed outwardly from the lower roll. The journal structures 253 for the upper roll 14 are adjustable by means of a hand screw 257 to adjust the nip of the rolls in accordance with the thickness of the work sheets.

As previously described, the platen press comprises the lower platen 11 onto which the work sheets are fed, and the upper movable platen 13. This latter platen is mounted in a press frame 261 which as illustrated in FIG. 11 seats on the structure of the lower platen 11 and is solidly anchored to the main frame 3 of the machine by tie bolts 262. The platen 13 is suspended from the piston rod 263 of the hydraulic cylinder and piston unit 21 as previously described and in the present instance, this cylinder is mounted in a head structure 264 which includes a pair of I-beams 265, 265 supported on the frame 261. The head structure also comprises a depending tube 266 within which is slidably guided an inner tubular member 267 which is secured to and extends upwardly from the platen 13.

Also supported on the head structure 264 are the four hydraulic pressure cylinders 22, the piston rod 268 of each of these cylinder units being secured to the platen, one at each corner of the latter. The manner in which these rods are connected to the platen is illustrated in FIG. 14 which shows that the lower ends of the rods 268 are threaded into the threaded bores of upstanding bosses 269 on the top of the platen. The rods 268 are secured to their respective pistons so as to afford freedom for turning the rods about their own axes, and for this purpose each of the rods is provided with a flange 271 having radial bores 272 for reception of a spanner wrench or other tool by means of which the rods may be turned. Turning of the rods will have the effect of elevating or lowering the connected portion of the platen 13 with respect to the piston associated with the particular connecting rod. In other words, assuming that the pistons are at the ends of their down strokes and in contact with the lower heads of the respective cylinders, it will be apparent that by adjustment of the rods the plane of the working face of the platen can be varied in slight degree. Each of the bosses 269 is provided with a split upper end which in conjunction with screws 273 provide a means for clamping the threaded ends of the rods 268 solidly in adjusted positions in the bosses.

Figure 13:
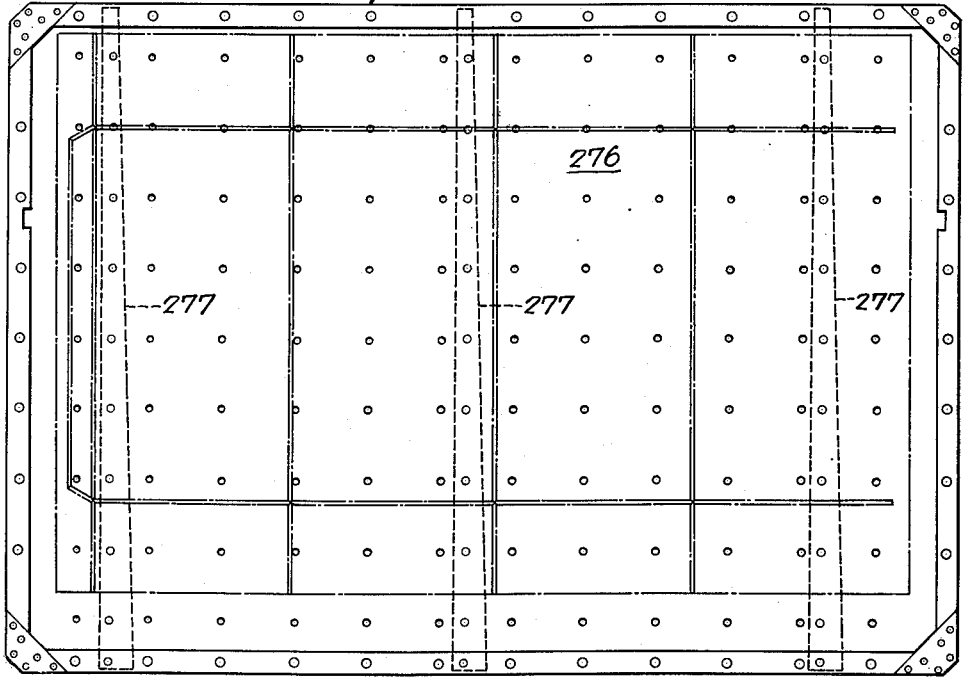
FIG. 13 is an inverted plan view showing the lower or working face of the upper platen of the press.

As also illustrated in FIGS. 14 and 15 and also in FIG. 13, the blank forming elements 274 are attached to the underside of a plate 275, and this plate is detachably secured to the underside of the platen 13 through the medium of an interposed carrier plate 276. This latter plate is provided with a tapered dovetail anchoring element or rib 277 which fits in an undercut recess 278 in the underside of the platen. Cooperating with the rib 277 is an oppositely dovetailed tapered feather 279 adjustably mounted in a second and confronting undercut recess 281 in the underside of the platen, and this feather may be adjusted longitudinally through the medium of a screw 282 journalled at 283 in the platen and having threaded engagement with an upstanding boss 284 on the said feather. By adjustment of the screw 282 the tapered feather 279 can be drawn into wedged engagement with the confronting side of the strip 277, as indicated in dotted lines in FIG. 12, thereby wedging this strip and also the feather securely into the dovetailed groove comprising the recesses 278 and 281. The plate 276 is thereby solidly secured to the lower face of the platen, as shown in FIG. 14.

It will be understood that the movements of the platen 13 to and from the working position and with respect to the lower platen 11 are effected by means of the hydraulic cylinder 21 and that the cylinders 22 are utilized to apply balanced pressure to the platen 13 in the actual forming operation when the forming tools are engaged with the blank. The adjusting means between the cylinders 22 and the platen 13 described above avoids necessity, as in prior devices, for shimming up or adjusting the working surface of the fixed platen when the blank is of a character such that the thrusts on the working face of the upper platen are unbalanced. By adjusting the connections between the pistons 22 and the platen, the platen may be made to squarely parallel the lower platen 11 at the termination of the working stroke so that the blanking operation on the work sheet is uniform and precise throughout.

I claim:

1. In a machine for performing operations on sheets of work material, a platen press comprising sheet-working elements and movable platen means for pressing the said sheets and elements together, mechanisms for feeding the work sheets successively to the press and for discharging said sheets after the pressing operation; means for registering the sheets with the said working elements in the press; hydraulic motor means for actuating the press, the feeding and discharging mechanisms, and the registering means; an electrical control system including control elements actuated by said sheets and said platen for actuating the motor means in predetermined repetitive sequence affording automatic cyclic operation of the machine, said registering means comprising a gate constituting a limit stop for the sheets in the press and mounted for movement by the hydraulic motor means to and from an operating position with respect to the sheets, and wherein further the electrical control system comprises a switch responsive to the individual sheets as they approach the gate station for actuating the motor means to move the gate into the operative position, and a second switch responsive to retraction of the movable platen means from pressing position for actuating the motor means to move the gate from the operative position.

2. A machine according to claim 1 wherein the electrical control system includes sheet-responsive switch means for interrupting operation of the feeding mechanisms when a sheet is engaged with the gate.

References Cited in the file of this patent

UNITED STATES PATENTS

| 796,523 | Morse | Aug. 8, 1905 |
| 1,479,464 | Fuller | Jan. 1, 1924 |
| 1,741,149 | Cogswell | Dec. 31, 1929 |
| 1,998,166 | Nelson | Apr. 16, 1935 |
| 2,033,865 | Platt | Mar. 10, 1936 |
| 2,045,047 | Nevitt | June 23, 1936 |
| 2,067,264 | Ernst | Jan. 12, 1937 |
| 2,067,943 | Nordquist | Jan. 19, 1937 |
| 2,073,320 | Smith | Mar. 9, 1937 |
| 2,113,110 | Ernst et al. | Apr. 5, 1938 |

(Other references on following page)

UNITED STATES PATENTS

| | | |
|---|---|---|
| 2,113,115 | MacMillin et al. | Apr. 5, 1938 |
| 2,172,502 | Dewitt | Sept. 12, 1939 |
| 2,443,281 | Terry | June 15, 1948 |
| 2,526,163 | Shippy | Oct. 17, 1950 |
| 2,610,684 | Bagdigian | Sept. 16, 1952 |
| 2,696,769 | Oberem | Dec. 14, 1954 |
| 2,705,142 | Gollwitzer | Mar. 29, 1955 |
| 2,719,037 | Gedde | Sept. 27, 1955 |
| 2,748,862 | Alspaugh | June 5, 1956 |
| 2,783,838 | Ericson et al. | Mar. 5, 1957 |